Patented July 22, 1952

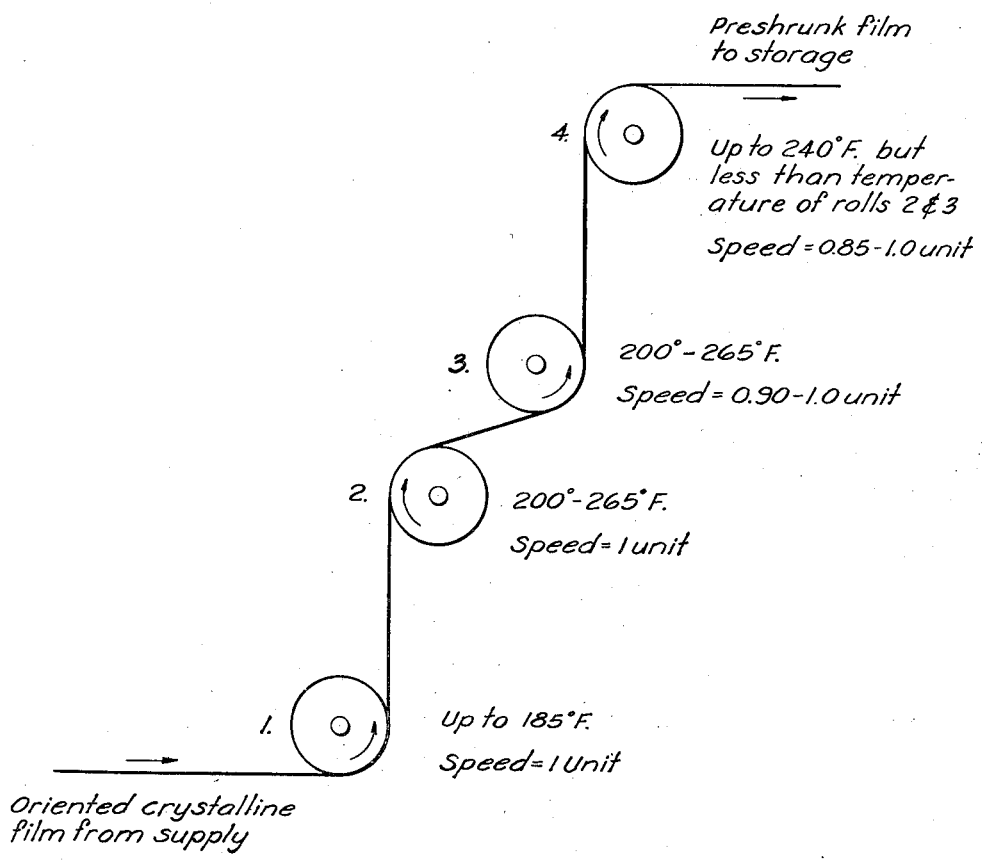

2,603,838

UNITED STATES PATENT OFFICE 2,603,838

METHOD FOR PRESHRINKING CRYSTALLINE VINYLIDENE CHLORIDE COPOLYMER FILM

Robert D. Lowry, Winchester, Mass., and Hugo L. Schaefer, Midland, Mich., assignors to The Dow Chemical Company, Midland, Mich., a corporation of Delaware Application August 1, 1949, Serial No. 107,958

5 Claims. (Cl. 18—48)

1

This invention relates to a method for preshrinking crystalline vinylidene chloride copolymer film whereby the film is rendered dimensionally stable at temperatures up to 212° F.

It has been shown by Wiley, in U. S. Patent No. 2,233,442, that those copolymers of vinylidene chloride which contain up to 20 per cent or so of a copolymerized monoethylenically unsaturated monomer are often crystalline, as determined by the X-ray diffraction patterns of such copolymers. It has also been shown that such normally crystalline copolymers of vinylidene chloride may be formed into useful oriented crystalline articles by a process including the successive steps of melting the copolymer, shaping it, cooling it rapidly to a temporarily non-crystalline, supercooled state, and cold-stretching the supercooled article. These properties have been utilized commercially in the production of strong, moisture-impervious flexible films by the process described by Stephenson in U. S. Patent No. 2,452,080. In the latter process, the copolymer is melted and extruded downwardly through a tube-forming orifice into a cold water bath, where it is supercooled. The supercooled tube is withdrawn from the bath and is inflated with air to effect a 3- to 5-fold radial distension and a 2- to 4-fold longitudinal stretch. The resulting oriented crystalline film may be used in its tubular form or it may be slit and opened to produce a flat film.

The film resulting from Stephenson's process is a useful article of commerce on account of its high tensile strength in both principal directions, its flexibillity, and especially because of its extreme resistance to permeability by water, water vapor and other liquids and vapors. It is used extensively for wrapping foods and other materials where it is desired either to retain natural moisture in or to exclude it from the wrapped article.

It has been observed that the oriented crystalline vinylidene chloride copolymer films discussed above have a tendency to shrink irregularly on standing at room temperature, even when under the tension existing in tightly wound rolls of the film in storage. Such wound films tend to shrink laterally, producing an irregular wrinkle effect in the film when it is subsequently unwound for use. The retraction which occurs on standing, coupled with the different degrees of stretching of the film radially and longitudinally during its production, gives a film with highly irregular and unpredictable shrinkage characteristics when subjected to elevated temperatures. It is common experience to find that oriented films shrink when heated, and, when such shrinkage is regular and uniform it is used to advantage in

2 certain types of packaging operations. On the other hand, if a film shrinks irregularly when exposed to heat, it cannot be used successfully to produce neatly packaged articles whenever a heat-seal is required in the wrapping operation. The welding of superposed layers of a thermally unstable film causes unsightly wrinkles and uneven tensions along the weld line. Various thermal treatments have been proposed for preshrinking oriented films so as to avoid or minimize these difficulties, but none has had sufficient manipulative flexibility to be practical. Laborious tests on small pieces of film have shown that, if the film can be processed in such a manner that subsequent exposure for about 10 minutes to temperatures up to 100° C. results in no more than 5 per cent shrinkage, the stated problems are avoided and the product is acceptable for the most exacting uses.

It is an object of the present invention to provide a method for preshrinking an oriented crystalline vinylidene chloride copolymer film to improve its reaction to subsequent heat treatment to a point at which exposure for 10 minutes to a temperature of 212° F. results in shrinkage of not to exceed 5 per cent along either major dimension of the film. A related object is to provide such a method which may be carried out as a part of the process in which the film is first produced. Another object is to provide a continuous process for preshrinking and thermally stabilizing the film, either as an adjunct of the original film-forming operations or to operate independently on a supply of film previously produced. Related objects may appear hereinafter.

The method of the present invention, whereby the foregoing and related objects are realized, comprises advancing a sheet of the film to be stabilized continuously, and under tension, over a series of at least four rotating smooth cylindrical surfaces spaced apart so that both sides of a given area of film are never in contact with two such surfaces at the same time, at least the intermediate two of which are at independently controlled temperatures of at least 200° F., the areas of contact between the film being treated and the respective smooth cylindrical heated surfaces being chosen to provide an aggregate contact time on said heated surfaces of from 1.5 to 20, and preferably from 2 to 6.5 seconds. The range of useful temperatures at each of the four successive points of contact between the film and the rotating cylindrical surfaces are, respectively; up to 185° F., 200–265° F., 200–265° F., and up to 240° F. The temperature at the first said point of contact should not exceed 185° F., as, at this point it is more important to have the film held smoothly and under tension than it is to effect any material shrinkage. At the second and third said contact points the temperature must be at least 200° F., or the film will not be sufficiently stabilized to show the desired residual shrinkage of less than 5 per cent at 212° F., and at these points the film should not be heated much over 265° F. or it will adhere to the heating surfaces and become badly distorted when separated therefrom. The final cylindrical contact surface may be unheated, as it is again more important that the film passing this surface be held smoothly and under tension than it is to attempt any further slight shrinkage. It is desirable that the final contact surface should not be heated higher than about 240° F., and in no event must it be as hot as the two intermediate contact surfaces, or the film leaving the four-stage treating zone will be too wrinkled and uneven. The four said cylindrical surfaces may be caused to rotate at the same peripheral speeds but, since the film being treated tends to shrink somewhat during the treatment it may emerge from the treating zone at a somewhat lower rate than the rate of feed to the treating zone. Accordingly, it has been found desirable to drive the respective contact surfaces at diminishing peripheral speeds. Thus, the first two cylindrical surfaces may have the same peripheral speeds, and the last two such surfaces and the product take-off roll may have lesser peripheral speeds down to about 85 per cent of the speed of the first two contact surfaces, as will be illustrated in examples to follow.

While the present invention does not require the use of any particular apparatus, and the various types of equipment which may be employed form no part of the present invention, the process may be understood more readily when described with reference to the accompanying drawing, the single diagrammatic figure of which illustrates, in vertical cross-section, a series of smooth cylindrical rollers for use in carrying out the present method. The legends on the drawing indicate preferred operating conditions.

Referring to the drawings, an oriented crystalline vinylidene chloride copolymer film is fed at a steady rate from a source (not shown), which may be a supply reel or may be the production process of Stephenson's U. S. Patent No. 2,452,080, and is passed successively over each of four smooth cylindrical rollers and thence to a wind-up reel (not shown). Tension is maintained on the film by any known means, such as auxiliary snubber rolls which are not illustrated. The four cylindrical rolls may be of identical size and may be driven at identical peripheral speeds by a single drive. They may have different diameters and thus have different peripheral speeds within the limits stated on the drawing. The various rolls may be driven individually so that, regardless of their relative sizes, the peripheral speeds may each be adjusted to within the ratios indicated on the drawing. The rolls may be stacked somewhat closer together than indicated in the drawing, to increase the area of contact between each roll and the film being treated, or they may be spaced farther apart to decrease the contact areas and, hence, the periods of exposure of the film to the temperatures of the respective rolls. The rolls are heated individually by any of several known means. The introduction of steam under carefully controlled pressures through the axis of each hollow roller is a convenient method of effecting the required temperature control.

In a specific example, a film 1 mil thick, composed of a plasticized copolymer containing about 92 per cent vinylidene chloride and 8 per cent vinyl chloride, by weight, in the copolymer molecule, was passed over the illustrated rollers at the speeds and exposed to the temperatures given in the following table. The film was kept under tension during treatment, and carefully measured samples of the finished product were heated in air at 212° F. for 10 minutes, after which they were remeasured, and residual shrinkage was computed as per cent of the corresponding dimension after heat treatment but before the shrinkage test. An increase in dimension in the 10 minute, 212° F. test is recorded as a negative (—) residual shrinkage. In the table, RT means room temperature.

*Table 1*

| Run No. | Speed of film over rolls, feet per minute | | | | Contact distance on rolls, feet | | | | Temperature of rolls, °F. | | | | Total contact with heated rolls, seconds | Per cent residual shrinkage | |
|---|---|---|---|---|---|---|---|---|---|---|---|---|---|---|---|
| | | | | | | | | | | | | | | Longitudinal | Transverse |
| 1 | (untreated control for Runs 2–18) | | | | | | | | | | | | | 28.3 | 23.5 |
| 2 | 4.3 | 4.3 | 4.3 | 4.3 | 0.83 | 0.62 | 0.62 | 0.88 | RT | 265 | RT | RT | 8.7 | 14.1 | −1.5 |
| 3 | 7.2 | 7.2 | 7.2 | 7.2 | 0.83 | 0.62 | 0.62 | 0.88 | RT | 265 | RT | RT | 5.2 | 9.8 | −2.9 |
| 4 | 11.7 | 11.7 | 11.7 | 11.7 | 0.83 | 0.62 | 0.62 | 0.88 | RT | 265 | RT | RT | 3.2 | 12.0 | −2.9 |
| 5 | 17.4 | 17.4 | 17.4 | 17.4 | 0.83 | 0.62 | 0.62 | 0.88 | RT | 265 | RT | RT | 2.1 | 9.8 | −2.2 |
| 6 | 27.9 | 27.9 | 27.9 | 27.9 | 0.83 | 0.62 | 0.62 | 0.88 | RT | 265 | RT | RT | 1.3 | 6.5 | 0 |
| 7 | 4.3 | 4.3 | 4.3 | 4.3 | 0.83 | 0.62 | 0.62 | 0.88 | RT | 265 | 265 | RT | 17.4 | 4.4 | −1.5 |
| 8 | 7.2 | 7.2 | 7.2 | 7.2 | 0.83 | 0.62 | 0.62 | 0.88 | RT | 265 | 265 | RT | 10.4 | 5.4 | −2.9 |
| 9 | 17.4 | 17.4 | 17.4 | 17.4 | 0.83 | 0.62 | 0.62 | 0.88 | RT | 265 | 265 | RT | 4.2 | 5.4 | −0.7 |
| 10 | 27.9 | 27.9 | 27.9 | 27.9 | 0.83 | 0.62 | 0.62 | 0.88 | RT | 265 | 265 | RT | 2.6 | 4.9 | −3.7 |
| 11 | 4.3 | 4.3 | 4.3 | 4.3 | 0.83 | 0.62 | 0.62 | 0.88 | 220 | 260 | 260 | RT | 28.9 | 9.2 | −2.9 |
| 12 | 27.9 | 27.9 | 27.9 | 27.9 | 0.83 | 0.62 | 0.62 | 0.88 | 220 | 260 | 260 | RT | 4.4 | 5.4 | −2.9 |
| 13 | 4.3 | 4.3 | 4.3 | 4.3 | 0.83 | 0.62 | 0.62 | 0.88 | 210 | 260 | 250 | 240 | 41.2 | 13.0 | −5.1 |
| 14 | 7.2 | 7.2 | 7.2 | 7.2 | 0.83 | 0.62 | 0.62 | 0.88 | 210 | 260 | 250 | 240 | 24.7 | 9.2 | −2.9 |
| 15 | 27.9 | 27.9 | 27.9 | 27.9 | 0.83 | 0.62 | 0.62 | 0.88 | 210 | 260 | 250 | 240 | 6.3 | 3.3 | −4.4 |
| 16 | 22.3 | 22.3 | 21.4 | 20.5 | 1.08 | 0.62 | 0.62 | 0.82 | RT | 255 | 260 | 210 | 5.8 | 4.9 | 0 |
| 17 | 22.3 | 22.3 | 21.4 | 20.5 | 1.08 | 0.62 | 0.62 | 0.82 | RT | 255 | 260 | 210 | 5.8 | 4.3 | −2.2 |
| 18 | 53.7 | 53.7 | 51.6 | 49.5 | 1.08 | 0.62 | 0.62 | 0.82 | RT | 255 | 260 | 210 | 2.4 | 5.4 | −2.9 |
| 19 | (untreated control for Runs 20–32) | | | | | | | | | | | | | 25.0 | 22.0 |
| 20 | 8.2 | 8.2 | 7.9 | 7.6 | 1.08 | 0.62 | 0.62 | 0.82 | RT | 215 | 260 | 210 | 15.7 | 2.2 | 0 |
| 21 | 22.3 | 22.3 | 21.4 | 20.5 | 1.08 | 0.62 | 0.62 | 0.82 | RT | 215 | 260 | 210 | 5.8 | 3.3 | −1.5 |
| 22 | 53.7 | 53.7 | 51.6 | 49.5 | 1.08 | 0.62 | 0.62 | 0.82 | RT | 215 | 260 | 210 | 2.4 | 5.4 | −2.9 |
| 23 | 8.2 | 8.2 | 7.9 | 7.6 | 1.08 | 0.62 | 0.62 | 0.82 | RT | 215 | 260 | RT | 9.2 | 2.7 | 0.7 |
| 24 | 22.3 | 22.3 | 21.4 | 20.5 | 1.08 | 0.62 | 0.62 | 0.82 | RT | 215 | 260 | RT | 3.4 | 3.3 | 0 |
| 25 | 53.7 | 53.7 | 51.6 | 49.5 | 1.08 | 0.62 | 0.62 | 0.82 | RT | 215 | 260 | RT | 1.4 | 4.9 | 0 |
| 26 | 8.2 | 8.2 | 7.9 | 7.6 | 1.08 | 0.62 | 0.62 | 0.82 | 180 | 220 | 260 | RT | 17.1 | 2.2 | −1.5 |
| 27 | 53.7 | 53.7 | 51.6 | 49.5 | 1.08 | 0.62 | 0.62 | 0.82 | 180 | 220 | 260 | RT | 2.6 | 4.3 | −1.5 |
| 28 | 8.2 | 8.2 | 7.9 | 7.6 | 1.08 | 0.62 | 0.62 | 0.82 | 185 | 215 | 255 | RT | 17.1 | 2.2 | 1.5 |
| 29 | 22.3 | 22.3 | 21.4 | 20.5 | 1.08 | 0.62 | 0.62 | 0.82 | 185 | 215 | 255 | RT | 6.3 | 3.3 | 0 |
| 30 | 53.7 | 53.7 | 51.6 | 49.5 | 1.08 | 0.62 | 0.62 | 0.82 | 185 | 215 | 255 | RT | 2.6 | 4.3 | 0 |

It is observed from the foregoing data that the exposure of the crystalline film to a single heated contact surface is insufficient to reduce the residual shrinkage value to the desired range of 5 per cent or less. It is noted, also, that the preferred operating conditions are those previously recited and that optimum results are obtained when the speeds of the third and fourth rotating contact surfaces are somewhat less than those of the first and second such surfaces. In no instances, reported in the table or discovered in numerous other tests, has the desired result been obtained when the aggregate priod of contact between the crystalline film and the various heated rolls has been in excess of 20 seconds. While untreated film has the property of shrinking from 20–30 per cent in both major directions when heated to 212° F. for 10 seconds, the film which has been treated in accordance with the present method and under the recited preferred conditions is seen to have shrinkage values near and usually less than 5 per cent in both major directions.

Reference has been made to the maintenance of tension on the film during treatment. The tension maintained should be sufficient to keep the film free from wrinkles and to advance it continuously through the treating zone but should be insufficient to cause actual stretching of the film. For this reason the codnitions used in runs Nos. 16–30 inclusive, in the foregoing table represent the preferred type of operation.

For convenience and for ready comparison between the results in the several tests, the foregoing table of data is based upon the use of a particular crystalline vinylidene chloride copolymer film. Experience has shown that the invention is not limited to this specific film but is equally useful with any oriented crystalline film of a vinylidene chloride copolymer. Numerous such copolymers are known and are commercially available. These may be made into films by the method described in the above identified Stephenson Patent No. 2,452,080. The compositions from which the crystalline and oriented films are made usually contain small amounts of a plasticizer to facilitate extruding the composition in film form and small amounts of other materials normally added to stabilize the polymer composition against the destructive effects of heat during the extrusion operation. The aggregate of such addition agents is usually no more than 10–12 per cent of the composition and, since these are standard constituents of the films here concerned, it is not deemed necessary to specify their presence in the films recited in the appended claims.

There is filed concurrently herewith an application of Walter A. Klein, Robert R. Trull, and Edward V. Dettmer entitled, "Apparatus for Preshrinking Crystalline Vinylidene Chloride Copolymer Film," now U. S. Patent 2,540,986. The apparatus described in the said patent is one of the ones which may be adapted for use in carrying out the process of the present invention.

We claim:

1. The method which comprises supplying continuously and at a steady linear rate an oriented crystalline vinylidene chloride copolymer film maintained under tension sufficient to advance the film in a wrinkle-free condition but insufficient to stretch the film, and applying the moving film successively to, by advancing it over, each of four non-contiguous rotating smooth cylindrical surfaces which are spaced apart so both sides of a given area of film are never in contact with two such surfaces at the same time, at least the second and third such surfaces being at independently controlled temperatures of at least 200° F. but not to exceed 265° F., the first said surface having a temperature between room temperature and 220° F. which temperature is less than those of the second and third said surfaces, and the fourth said surface being at a temperature from room temperature to 240° F. which is also less than those of the second and third said surfaces, the areas of contact between the moving film and the various heated cylindrical surfaces and the rate of advance of the film over said surfaces being adjusted to provide an aggregate contact time between the film and the heated surfaces of from 1.5 to 20 seconds, and withdrawing continuously the so-treated film from the treating zone.

2. The method which comprises supplying continuously and at a steady linear rate an oriented crystalline vinylidene chloride copolymer film maintained under tension sufficient to advance the film in a wrinkle-free condition but insufficient to stretch the film, and applying the moving film successively to, by advancing it over, each of four non-contiguous rotating smooth cylindrical surfaces which are spaced apart so that both sides of a given area of film are never in contact with two such surfaces at the same time, at least the second and third such surfaces being at independently controlled temperatures of at least 200° F. but not to exceed 265° F., the first said surface having a temperature between room temperature and 220° F. which temperature is less than those of the second and third said surfaces, and the fourth said surface being at a temperature from room temperature to 240° F. which is also less than those of the second and third said surfaces, the areas of contact between the moving film and the various heated cylindrical surfaces and the rate of advance of the film over said surfaces being adjusted to provide an aggregate contact time between the film and the heated surfaces of from 2 to 6 seconds, and withdrawing continuously the so-treated film from the treating zone.

3. The method which comprises supplying continuously and at a steady linear rate an oriented crystalline vinylidene chloride copolymer film maintained under tension sufficient to advance the film in a wrinkle-free condition but insufficient to stretch the film, and applying the moving film successively to, by advancing it over, each of four non-contiguous rotating smooth cylindrical surfaces which are spaced apart so that both sides of a given area of film are never in contact with two such surfaces at the same time, the first of which surfaces is at a temperature from room temperature to 185° F. inclusive, the second of which is at a temperature from 215°–260° F., the third of which is at a temperature from 250°–265° F., and the fourth of which is at a temperature from 210°–240° F., the areas of contact between the moving film and the various heated cylindrical surfaces and the rate of advance of the film over said surfaces being adjusted to provide an aggregate contact time between the film and the heated surfaces of from 2 to 6 seconds, and withdrawing continuously the so-treated film from the treating zone.

4. The method as claimed in claim 3 in which the peripheral speeds of the third and fourth rotating cylindrical surfaces are from 85–100 per cent of the speed of the first two surfaces, the speed of the fourth surface being no greater than that of the third such surface.

5. The method as claimed in claim 3 wherein the peripheral speed of the third rotating cylindrical surface is about 96 per cent of the speed of the first two surfaces and that of the fourth said surface is about 92 per cent of that of the first two surfaces.

ROBERT D. LOWRY.
HUGO L. SCHAEFER.

REFERENCES CITED

The following references are of record in the file of this patent:

UNITED STATES PATENTS

| Number | Name | Date |
|---|---|---|
| 2,239,780 | Fikentscher et al. | Apr. 29, 1941 |
| 2,434,541 | Bierer | Jan. 13, 1948 |
| 2,517,581 | Lowry et al. | Aug. 8, 1950 |